USO11341562B2

(12) United States Patent
Huseth et al.

(10) Patent No.: US 11,341,562 B2
(45) Date of Patent: May 24, 2022

(54) TAG FOR ORDER FULFILLMENT

(71) Applicant: Honeywell International Inc., Morris Plains, NJ (US)

(72) Inventors: Steve Huseth, Plymouth, MN (US); Erik Todeschini, Camillus, NY (US)

(73) Assignee: Honeywell International Inc., Morris Plains, NJ (US)

( * ) Notice: Subject to any disclaimer, the term of this patent is extended or adjusted under 35 U.S.C. 154(b) by 14 days.

(21) Appl. No.: 16/783,776

(22) Filed: Feb. 6, 2020

(65) Prior Publication Data

US 2020/0175571 A1 Jun. 4, 2020

Related U.S. Application Data

(62) Division of application No. 14/992,536, filed on Jan. 11, 2016, now Pat. No. 10,600,109.

(51) Int. Cl.
*G06Q 30/00* (2012.01)
*G06Q 30/06* (2012.01)
*B65G 1/137* (2006.01)
*G01C 21/00* (2006.01)
*G06Q 10/08* (2012.01)
*G08B 5/38* (2006.01)
*H04B 5/00* (2006.01)

(52) U.S. Cl.
CPC ....... *G06Q 30/0635* (2013.01); *B65G 1/1373* (2013.01); *G01C 21/00* (2013.01); *G06Q 10/087* (2013.01); *G08B 5/38* (2013.01); *H04B 5/0056* (2013.01)

(58) Field of Classification Search
CPC ............ G06Q 30/0635; G06Q 10/087; B65G 1/1373; G08B 5/38; H04B 5/0056; G01C 21/00
USPC ...................................... 705/26, 27
See application file for complete search history.

(56) References Cited

U.S. PATENT DOCUMENTS

| 6,089,453 | A | 7/2000 | Kayser et al. |
| 6,650,225 | B2 * | 11/2003 | Bastian, II ............. G06F 3/147 340/5.9 |
| 8,432,259 | B2 | 4/2013 | Huang et al. |
| 8,972,043 | B2 | 3/2015 | Foster et al. |
| 9,171,278 | B1 | 10/2015 | Kong et al. |
| 9,582,826 | B2 | 2/2017 | Calman et al. |
| 9,852,394 | B1 | 12/2017 | Rouaix et al. |
| 2001/0045893 | A1 | 11/2001 | Swartzel et al. |
| 2002/0070846 | A1 | 6/2002 | Bastian et al. |

(Continued)

OTHER PUBLICATIONS

Decision to Refuse Application issued in European Application No. 16205579.2 dated May 3, 2021, 16 pages.

(Continued)

*Primary Examiner* — Robert M Pond
(74) *Attorney, Agent, or Firm* — Alston & Bird LLP

(57) ABSTRACT

Methods, devices, and systems for a tag for order fulfillment are described herein. One or more embodiments include a number of tags each associated with a corresponding inventory bin of a warehouse, each tag configured to broadcast unique identification information, and a mobile device configured to receive, from a database, order information including identification information of one of the number of tags and a type and a quantity of an item of an inventory bin of the warehouse corresponding to the tag, and scan for identification information of the tag.

20 Claims, 4 Drawing Sheets

(56) References Cited

U.S. PATENT DOCUMENTS

| | | |
|---|---|---|
| 2004/0088229 A1 | 5/2004 | Xu |
| 2004/0203409 A1 | 10/2004 | Swan |
| 2005/0278062 A1 | 12/2005 | Janert et al. |
| 2006/0059049 A1 | 3/2006 | Morris et al. |
| 2007/0050080 A1 | 3/2007 | Peck |
| 2007/0099623 A1 | 5/2007 | Stephensen et al. |
| 2007/0142961 A1 | 6/2007 | Bhasin et al. |
| 2007/0215700 A1 | 9/2007 | Reznik et al. |
| 2009/0166415 A1 | 7/2009 | Braun et al. |
| 2013/0015971 A1 | 1/2013 | Caporizzo |
| 2013/0191246 A1 | 7/2013 | Calman et al. |
| 2014/0188270 A1 | 7/2014 | Stelzer et al. |
| 2017/0061525 A1 | 3/2017 | McCoy et al. |

OTHER PUBLICATIONS

Minutes to the Oral Proceeding issued in European Application No. 16205579.2 on Apr. 30, 2021, 2 pages.

Summons to Attend Oral Proceedings Pursuant to Rule 115(1) issued in European Application No. 16205579.2, dated Oct. 2, 2020, 10 pages.

"Strategies for a Radio Frequency Identification (RFID) System in a Distribution Center Environment," Ross et al., Journal of Business Logistics 30.1: 157-IX. Hoboken: Blackwell Publishing Ltd. (2009); Dialog #212667298; 28pgs (Year: 2009).

Annex to the communication dated Mar. 3, 2020 for EP Application No. 16205579.

Annex to the communication dated Oct. 4, 2019 for EP Application No. 16205579.

Applicant Initiated Interview Summary (PTOL-413) dated Jan. 30, 2019 for U.S. Appl. No. 14/992,536.

Applicant Initiated Interview Summary (PTOL-413) dated Oct. 5, 2018 for U.S. Appl. No. 14/992,536.

Article 94 (3) Communication for European Application No. 16205579.2, dated Oct. 4, 2019, 6 pages.

Atop Technologies, Pick-to-Light System Cableless Products, http://www.atop.com.tw/atop/mw/cufiles/files/download_dm/pick_dm/ABLEPick_DM_E.pdf, 14 pp.

Communication from the Examining Division dated Mar. 3, 2020 for EP Application No. 16205579.

Communication from the Examining Division dated Oct. 4, 2019 for EP Application No. 16205579.

European search opinion dated Mar. 17, 2017 for EP Application No. 16205579.

European search report dated Mar. 17, 2017 for EP Application No. 16205579.

Extended Search Report from related European Patent Application No. 16205579, dated Mar. 17, 2017, 5 pages.

Final Rejection dated Aug. 28, 2019 for U.S. Appl. No. 14/992,536.

Final Rejection dated Oct. 5, 2018 for U.S. Appl. No. 14/992,536.

Non-Final Rejection dated Apr. 23, 2018 for U.S. Appl. No. 14/992,536.

Non-Final Rejection dated Mar. 8, 2019 for U.S. Appl. No. 14/992,536.

Notice of Allowance and Fees Due (PTOL-85) dated Nov. 6, 2019 for U.S. Appl. No. 14/992,536.

U.S. Appl. No. 14/992,536, filed Jan. 11, 2016, U.S. Pat. No. 10,600,109, Patented.

Non-Final Office Action received for U.S. Appl. No. 16/783,779, dated Aug. 3, 2021, 20 pages.

Non-Final Office Action received for U.S. Appl. No. 16/783,779, dated Jan. 28, 2022, 25 pages.

\* cited by examiner

TAG FOR ORDER FULFILLMENT

CROSS REFERENCE TO RELATED APPLICATIONS

This application is a divisional of and claims priority to U.S. application Ser. No. 14/992,536 (now U.S. Pat. No. 10,600,109), titled "TAG FOR ORDER FULFILLMENT," filed Jan. 11, 2016, the contents of which are incorporated herein by reference in their entirety.

TECHNICAL FIELD

The present disclosure relates to methods, devices, and systems for a tag for order fulfillment.

BACKGROUND

Order fulfillment operations in a facility such as a warehouse, for example, can include filling orders by picking inventory from bins located on shelves or placing inventory in bins located on shelves of a warehouse. Many order fulfillment operations can take place in large warehouse settings. Therefore, warehouse operators may want to be vigilant about users picking and/or placing the correct item type, quantity, and location of inventory items, as well as performing pick and/or place operations quickly and efficiently. Additionally, warehouse operators may want to ensure users are following efficient routes through the warehouse to the inventory items to be picked or placed.

Attaching a light to each item bin in a warehouse can be one strategy to provide assistance to users picking and/or placing items on warehouse shelves. However, attaching a light to each bin may require the lights to be powered, as well as connected to a central system to turn on the correct light. Additionally, one light may be confusing if multiple users are working in the same area of the warehouse.

DETAILED DESCRIPTION

Systems, methods, and devices for order fulfillment are described herein. For example, one or more embodiments include a number of tags each associated with a corresponding inventory bin of a warehouse, each tag configured to broadcast unique identification information, and a mobile device configured to receive, from a database, order information including identification information of one of the number of tags and a type and a quantity of an item of an inventory bin of the warehouse corresponding to the tag, and scan for identification information of the tag.

Tags broadcasting unique identification information can allow a user with mobile device to quickly and efficiently navigate a facility such as a warehouse to find the tag corresponding to a bin including items for a pick/place order in the warehouse, as well as select the correct type and quantity of an item from the bin. Once the mobile device is within a threshold distance of the tag, the mobile device can cause a light of the tag to turn on, allowing the user to easily find the tag and the corresponding bin while avoiding confusion with other users in the warehouse similarly performing pick/place orders.

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that process, electrical, and/or structural changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure, and should not be taken in a limiting sense.

Figure 1:
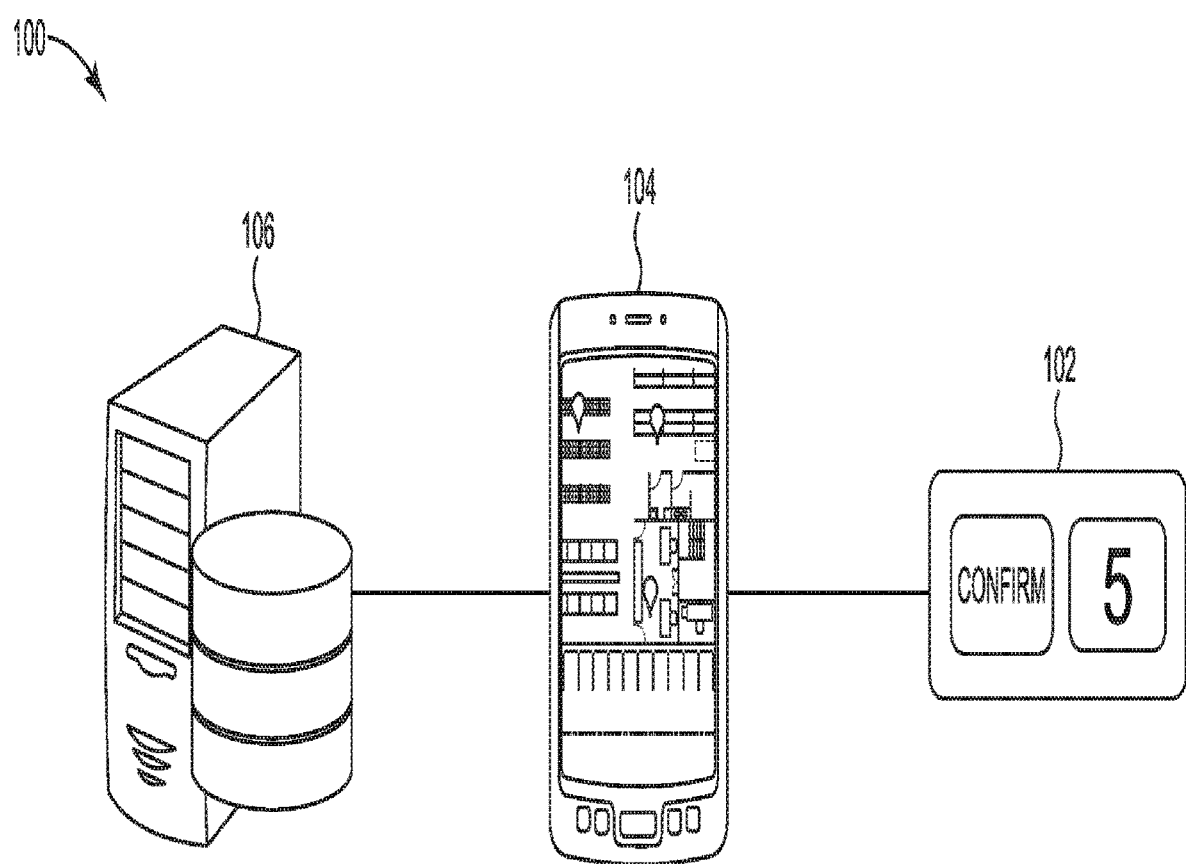
FIG. 1 illustrates a system for order fulfillment, in accordance with one or more embodiments of the present disclosure.
Figure 4:
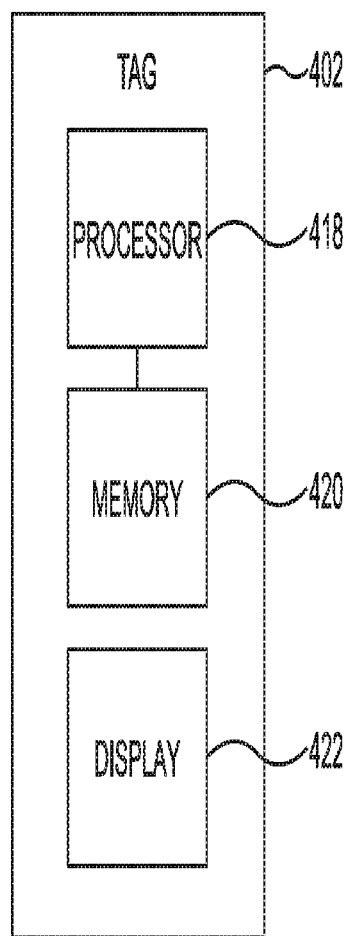
FIG. 4 is a schematic block diagram of a tag for order fulfillment, in accordance with one or more embodiments of the present disclosure.

The figures herein follow a numbering convention in which the first digit or digits correspond to the drawing figure number and the remaining digits identify an element or component in the drawing. Similar elements or components between different figures may be identified by the use of similar digits. For example, tag 102 as shown in FIG. 1 can be tag 402, as shown in FIG. 4. Additionally, the designator "N", as used herein, particularly with respect to reference numerals in the drawings, indicates that a number of the particular feature so designated can be included with a number of embodiments of the present disclosure.

As used herein, "a" or "a number of" something can refer to one or more such things. For example, "a number of tags" can refer to one or more tags.

FIG. 1 illustrates a system for order fulfillment, in accordance with one or more embodiments of the present disclosure. As shown in FIG. 1, system 100 can include a tag 102, a mobile device 104, and a database 106.

Tag 102 can broadcast unique identification information. Tag 102 can utilize a lower power radio included in tag 102 to broadcast the unique identification information. For example, the low power radio of tag 102 can utilize a low power wireless personal area network radio, such as Bluetooth low energy radio, to broadcast the unique identification information of tag 102, although embodiments of the present disclosure are not limited to Bluetooth low energy radio.

Tag 102 can be associated with an inventory bin. A warehouse can include many items that may be organized by item type, where each item type can include a bin that stores the items. For example, a warehouse may store a first product in a first inventory bin, and a second product in a second inventory bin. Inventory bins may be stored in or on shelving included in the warehouse in order to maximize the space available to the warehouse to store items.

As used herein, unique identification information of tag 102 can include a media access control (MAC) address, as well as physical location information. A MAC address can refer to a unique identifier assigned to network interfaces for communications on a physical network. The MAC address can be unique to tag 102. Further, the physical location information can include coordinate location information that can be unique to a warehouse the tag is placed in. For example, physical location information can include coordinate location information corresponding to a physical location of the tag in the warehouse.

Although tags are described as being included in a facility such as a warehouse, embodiments of the present disclosure are not so limited. For example, tags can be placed in any other type of building, as well as an outdoor environment, such as an indoor and/or outdoor warehouse setting.

Although not shown in FIG. 1 for clarity and so as not to obscure embodiments of the present disclosure, system 100 can include more than one tag. For example, system 100 can include a number of tags, as will be further described in connection with FIG. 3. Each of the number of tags can include a unique MAC address to uniquely identify each tag to mobile device 104, as will be further described herein.

System 100 can include a mobile device 104. Mobile device 104 can receive order information from a database 106. As used herein, a mobile device can include devices that are (or can be) carried and/or worn by a user. For example, mobile device 104 can be a phone (e.g., a smart phone), a tablet, a personal digital assistant (PDA), smart glasses, and/or a wrist-worn device (e.g., a smart watch), among other types of mobile devices.

As used herein, database 106 can refer to an inventory database. For example, database 106 can be an inventory database that can store inventory information of the warehouse, order information, tag information that can include tag identification and positional information, and user identity information, among other types of information.

Mobile device 104 can receive order information from database 106. Receiving order information at mobile device 104 can include receiving an item type and/or quantity for a user to pick and/or place from an inventory bin. For example, a business that may utilize a warehouse to store items for sale can receive an order for items from a customer. Database 106 can send order information corresponding to the customer's order to mobile device 104, which can include a type of item, a quantity of the item, as well as identification information of a tag corresponding to the inventory bin having the type of item. The order information can additionally enable a user to navigate the warehouse to select the type and quantity of item included in the order information.

Mobile device 104 can receive order information from database 106 via a network relationship. For example, mobile device 104 can receive order information from database 106 via a wired or wireless network. The wired or wireless network can be a network relationship that connects mobile device 104 to database 106. Examples of such a network relationship can include a local area network (LAN), wide area network (WAN), personal area network (PAN), a distributed computing environment (e.g., a cloud computing environment), storage area network (SAN), Metropolitan area network (MAN), a cellular communications network, and/or the Internet, among other types of network relationships.

Once order information is received at mobile device 104, mobile device 104 can scan for identification information of tag 102. For example, mobile device 104 can scan for identification information included in the order information received from database 106. Scanning for identification information can include utilizing a radio included in mobile device 104 to scan for the identification information broadcast by the lower power radio of tag 102. That is, mobile device 104 can scan for identification information such as the physical location information of tag 102 as well as the MAC address of tag 102, included in the order information received at mobile device 104 from database 106.

A user of mobile device 104 can utilize the physical location information of tag 102 included in the order information to determine a physical coordinate location of tag 102 within the warehouse. For example, using the physical location information, mobile device 104 can display tag 102 on a warehouse map displayed to the user via a display of mobile device 104. Utilizing the location of tag 102 displayed on the warehouse map via the display of mobile device 104, a user can navigate through the warehouse to tag 102.

Once mobile device 104 is within a threshold distance of tag 102, mobile device 104 can begin communicating with tag 102. That is, mobile device 104 can communicate with tag 102 in response to mobile device 104 being within a threshold distance of tag 102. For example, once mobile device 104 is within 50 feet of tag 102, mobile device 104 can begin communicating with tag 102. As another example, once mobile device 104 is within 75 feet of tag 102, mobile device 104 can begin communicating with tag 102.

As used herein, the threshold distance of a tag can refer to the range of the low power radio of the tag. For example, the range of the low power radio of the tag can be 50 feet, which can correspond to the threshold distance of the tag.

Although the threshold distance of tag 102 is described as being 50 feet or 75 feet, embodiments of the present disclosure are not so limited. For example, the threshold distance can be between 50 and 75 feet. However, the threshold distance can also be less than 50 feet, or more than 75 feet.

The threshold distance can be based on the layout of tags of the warehouse. For example, the threshold distance of tag 102 can be less than 50 feet if the warehouse includes a large number of tags in a confined area. As another example, the threshold distance of tag 102 can be more than 75 feet if the warehouse includes a small number of tags that are spaced apart.

Communication with tag 102 by mobile device 104 can include sending information from mobile device 104 to tag 102. For example, in response to mobile device 104 being within a threshold distance of tag 102, mobile device can send a pick quantity of an item to be picked and/or a place quantity of an item to be placed to tag 102.

Sending information from mobile device 104 to tag 102 can include information to cause a light of tag 102 to activate. That is, a light included with tag 102 can activate in response to mobile device 104 being within a threshold distance of tag 102. For example, mobile device 104 can send an instruction to tag 102 to activate a light included with tag 102. Additionally, tag 102 can include a display that can display the pick and/or place quantity of an item to be picked and/or placed, as will be further described herein.

A user of mobile device 104 can utilize the light of tag 102 to quickly locate tag 102 and the bin corresponding to tag 102. For example, the user can utilize the light of tag 102 to visually locate tag 102 and the corresponding bin of items. Once the user has located the bin, the user can pick and/or place the requested item and quantity of item out of and/or into the bin, respectively. For example, the user can pick out a quantity of items from the bin associated with tag 102 in order to satisfy the order information, where the quantity of items to be picked from the bin were included in order information received from database 106 at mobile device 104.

In some embodiments, each user's corresponding mobile device can cause a light of tag 102 to activate as a unique color. That is, in facilities that may include a number of users performing pick and/or place operations, each user's mobile device can cause a light of the number of tags to activate a unique color to enable multiple users to perform pick and/or place operations in a small area. For example, a first user may cause a light of a first tag to activate as a blue color, and a second user may cause a light of a second tag that may be located close to the first tag to activate as a yellow color. In this way, multiple users can perform pick and/or place operations in a confined area while avoiding confusion as to which user is activating the light of each tag.

In some embodiments, each user's corresponding mobile device can cause a light of tag 102 to continuously blink (e.g., strobe) at a unique frequency and/or pattern. That is, in facilities that may include a number of users performing pick and/or place operations, each user's mobile device can cause a light of the number of tags to blink a unique frequency and/or pattern to enable multiple users to perform pick and/or place operations in a small area. For example, a first user may cause a light of a first tag to blink at a first frequency, and a second user may cause a light of a second tag that may be located close to the first tag to blink at a second frequency that is faster and/or slower than the blink frequency of the first tag. In this way, multiple users can perform pick and/or place operations in a confined area while avoiding confusion as to which user is activating the light of each tag.

Although described as assigning unique colors or blink frequencies for each user's corresponding mobile device, embodiments of the present disclosure are not so limited. For example, a unique color can be combined with a unique blink frequency to further distinguish users performing pick and/or place operations in a confined area.

In some embodiments, sending information from mobile device 104 to tag 102 can include information to cause an audio tone of tag 102 to be activated via a speaker of tag 102. For example, mobile 104 can send an instruction to tag 102 to play an audio tone through a speaker of tag 102 that a user can utilize to audibly locate tag 102. Each user's mobile device can cause a unique audio tone to be activated at tag 102, allowing multiple users who may be performing pick/place operations in the same area to find the correct tag among various other tags that may be emitting audio tones corresponding to the multiple other users in the area.

Satisfying the order information can include a user picking a correct type and a correct quantity of an item included in the order information. For example, once a user has located tag 102 and the corresponding bin that includes items to be picked, the user can pick the correct quantity of items from the bin in order to satisfy the order information received at mobile device 104 from database 106.

Picking items from a bin can be done in response to a customer placing an order for a particular item and/or number of items. For example, in response to a customer order for an item, a user of mobile device 104 can pick the item to satisfy order information corresponding to the customer's order.

Satisfying the order information can include a user placing a correct type and a correct quantity of an item included in the order information. For example, once a user has located tag 102 and the corresponding bin that includes items to be placed, the user can place the correct quantity of items into the bin in order to satisfy the order information received at mobile device 104 from database 106.

Placing items from a bin can be done in response a particular item and/or number of items needing to be placed in a bin. For example, in response to a customer return of an item, a user of mobile device 104 can place the item to satisfy order information corresponding to the customer's return. As another example, in response to new inventory items being received at the warehouse, a user of mobile device 104 can place the newly received items into the correct bins.

Once a user has picked and/or placed the correct item and quantity of items, mobile device 104 can receive confirmation information from tag 102 in response to the order information being satisfied. That is, mobile device 104 can receive confirmation information from tag 102 in response to a type and quantity of the item being picked and/or placed.

In some embodiments, receiving confirmation information from tag 102 can include receiving confirmation information in response to a user of mobile device 104 pressing a button on tag 102. For example, once a user has picked and/or placed the correct type and quantity of items from a bin associated with tag 102, the user can press a button on tag 102 to confirm the pick and/or placement of items. Pressing the button on tag 102 can cause tag 102 to send the confirmation information to mobile device 104.

In some embodiments, receiving confirmation information from tag 102 can include receiving confirmation information in response to a user inputting a confirmation code generated by tag 102 into mobile device 104. For example, once a user has picked and/or placed the correct type and quantity of items from a bin associated with tag 102, tag 102 can generate a unique confirmation code. The user of mobile device 102 may be required to enter the confirmation code into mobile device 104 to confirm the pick and/or placement of items. As a particular example, the user may be required to type the confirmation code into mobile device 104 via an input to mobile device 104 such as a keyboard or via a display of mobile device 104. As a further example, a user may be required to audibly enter (e.g., speak) the confirmation code into mobile device 104; that is, a microphone or other audible reception mechanism of mobile device 104 may receive the confirmation code as the user audibly speaks the confirmation code.

In some embodiments, tag 102 can generate the confirmation code in response to a user pressing a button on tag 102 to confirm the pick and/or placement of items. For example, once a user has picked and/or placed the correct item and quantity of item and pressed the button on tag 102, tag 102 can generate the confirmation code to be entered into mobile device 104.

In some embodiments, tag 102 can generate the confirmation code in response to mobile device 104 being within the threshold distance of tag 102. For example, tag 102 can automatically generate a confirmation code in response to mobile device 104 being within the threshold distance of tag 102. In another example, once mobile device 104 is within the threshold distance of tag 102, mobile device 104 can include in the information sent to tag 102 an instruction to generate the confirmation code.

Mobile device 104 can receive the confirmation information from tag 102 via a network relationship. For example, mobile device 104 can receive confirmation information from tag 102 via a wired or wireless network. The wired or wireless network can be a network relationship that connects mobile device 104 to tag 102. Examples of such a network relationship can include a local area network (LAN), wide area network (WAN), personal area network (PAN), a distributed computing environment (e.g., a cloud computing environment), storage area network (SAN), Metropolitan area network (MAN), a cellular communications network, and/or the Internet, among other types of network relationships.

Mobile device 104 can send the confirmation information received by tag 102 to database 106. For example, mobile device 104 can send the confirmation information received from tag 102 to database 106 via a wired or wireless network. The wired or wireless network can be a network relationship that connects mobile device 104 to database 106. Examples of such a network relationship can include a local area network (LAN), wide area network (WAN), personal area network (PAN), a distributed computing environment (e.g., a cloud computing environment), storage area network (SAN), Metropolitan area network (MAN), a cellular communications network, and/or the Internet, among other types of network relationships.

Sending the confirmation information to database 106 can be important in keeping accurate records of inventory. For example, once confirmation information is received by database 106, a quantity of a particular item that was picked and/or placed can be updated in database 106. In particular, a quantity of an item can be decreased if the user is picking items or increased if the user is placing items in order to maintain an accurate inventory of items in the warehouse.

Mobile device 104 can display a path for a user to tag 102 based on a physical location of tag 102 as well as a location of mobile device 104. For example, mobile device 104 can utilize location information of tag 102 included in the order information received from database 106, as well as the current location of mobile device 104 to generate an efficient path from the current location of mobile device 104 to tag 102, as will be further described in connection with FIG. 3. The path can be the most efficient path from the current location of mobile device 104 to tag 102.

Generating a path for a user of mobile device 104 can allow for a user to be efficient in travel time between tag/bin locations. For example, a user given a more efficient path between tag/bin locations may be able to pick and/or place more items in a shorter amount of time.

Mobile device 104 can add one or more additional tags to database 106. For example, a new tag may be placed in a warehouse to correspond with a new bin. Mobile device 104 can utilize a displayed map to digitally place the tag and determine the physical location information corresponding to the placed tag location. Further, mobile device 104 can define the new tag's MAC address, as well as other applicable identification information for the new tag. Mobile device 104 can send this information to database 106.

Mobile device 104 can include identify information of a user of mobile device 104. For example, a warehouse may have multiple personnel responsible for picking and/or placing items. Each of these users may have a mobile device. Each mobile device can include identity information that identifies each user.

Identity information of a user of mobile device 104 and identification information of the tag can be sent to database 106 in response to mobile device 104 being within a threshold distance of one of a number of tags. For example, when a user moves by a tag (e.g., within a threshold distance of a tag (e.g., tag 102)) included in system 100, the mobile device can receive the identification information of the tag, and send the identity information of mobile device 104 as well as the identification information of the tag to database 106. Mobile device 104 can send to database 106 identity information of mobile device 104, as well as identification information of each tag the user comes to within a threshold distance of. Database 106 can utilize the identity information from mobile device 104, as well as the identification information from each tag to determine a location of the user of mobile device 104.

Utilizing the identity information from mobile device 104 as well as the identification information from the tag can allow database 106 to track users as they move about the warehouse. Tracking users can allow for a supervisor of the users to review user performance metrics, as well as allow for more efficient training procedures to be developed. Additionally, indoor positioning can allow for real-time item tracking and monitoring. Further, tracking users can allow for hazard prevention, such as alerting a user of a mobile device that a forklift may be nearby.

Receiving order information at a mobile device, scanning for identification information of a tag included in the order information, and causing a light of the tag to activate once the mobile device is within a vicinity (e.g., a threshold distance) of the tag can allow for a low cost and low effort strategy for managing order fulfillment operations. Low cost and simple commissioning of tags can allow for users to easily and quickly navigate a potentially large warehouse and accurately select the correct type and quantity of item requested.

Figure 2:
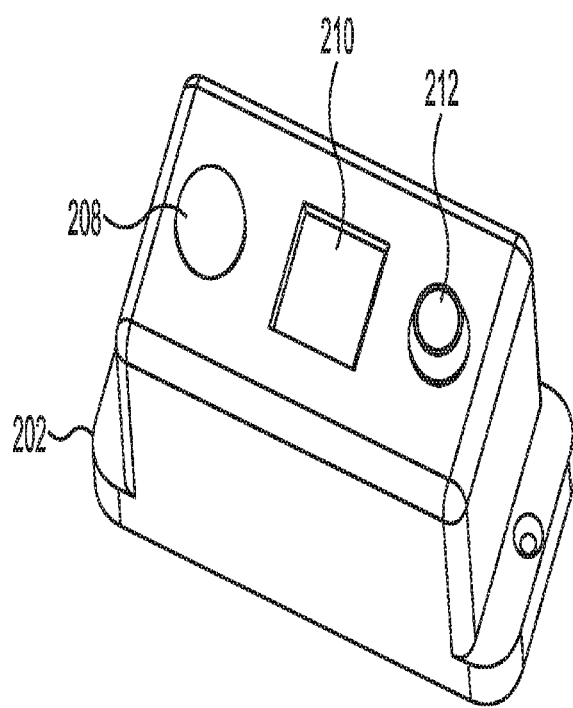
FIG. 2 illustrates a tag for order fulfillment, in accordance with one or more embodiments of the present disclosure.

FIG. 2 illustrates a tag for order fulfillment, in accordance with one or more embodiments of the present disclosure. As shown in FIG. 2, tag 202 can include a light 208, a display 210, and a button 212.

As previously described in connection with FIG. 1, tag 202 can be associated with an inventory bin of a warehouse and broadcast identification information unique to tag 202, and receive information from a mobile device (e.g., mobile device 104, previously described in connection with FIG. 1) that can include a pick count and instructions to activate light 208 of tag 202 in response to the mobile device being within a threshold distance of tag 202.

In some embodiments, light 208 can be a light emitting diode (LED). For example, tag 202 can include an LED as light 208, where the LED can be activated as multiple different colors and/or blink frequencies based on the received information from the mobile device in response to the mobile device being within a threshold distance of tag 202.

Although not shown in FIG. 2 for clarity and so as not to obscure embodiments of the present disclosure, tag 202 can include one or more speakers to play a unique audio tune in response to a user being within a threshold distance of tag 202. That is, tag 202 to play an audio tune through one or more speakers of tag 202, where the audio tune is unique to each user's mobile device Tag 202 can display a pick count received in the order information from the mobile device via a display 210. Display 210 can be a liquid-crystal display (LCD). For example, the mobile device can send to tag 202 a pick and/or place count (e.g., five items), and the LCD display 210 can display the number 5 to a user to indicate the pick and/or place count as being five items.

Once a user has picked and/or placed the correct item and quantity of items, the mobile device can receive confirmation information from tag 202 in response to the order information being satisfied, as previously described with respect to FIG. 1. That is, the mobile device can receive confirmation information from tag 202 in response to a type and quantity of the item being satisfied.

Tag 202 can generate, based on the information received from the mobile device, a confirmation code and display the confirmation code via display 210. For example, a random and/or unique confirmation code can be displayed via display 210 that a user of the mobile device may need to input into the mobile device to confirm the item type and quantity has been correctly picked and or placed. That is, the mobile device can receive confirmation information after the user of the mobile device inputs the confirmation code into the mobile device.

Receiving confirmation information from tag 202 can include receiving confirmation information in response to a user of a mobile device pressing button 212 on tag 202. For example, once a user has picked and/or placed the correct type and quantity of items from a bin associated with tag 202, the user can press button 212 on tag 202 to confirm the pick and/or placement of items.

Although not shown in FIG. 2 for clarity and so as not to obscure embodiments of the present disclosure, tag 202 can include a number of sensors. The number of sensors of tag 202 can sense, for example, a number of environmental conditions of the warehouse. The number of sensors can include ambient pressure, temperature, humidity, lighting, radiation, and/or vibration sensors, although embodiments of the present disclosure are not limited to the sensors listed above.

In some embodiments, temperature sensors can allow tags of the warehouse to monitor dynamic temperature changes and temperature adjustments in the warehouse. For example, monitoring real time temperature can allow for temperature management for a more energy efficient warehouse. Additionally, monitoring temperature can allow for fire detection. For example, a large temperature rise of one tag relative to other tags may indicate that a fire may be occurring near the tag.

Humidity sensors can allow tags of the warehouse to monitor humidity changes and adjustments in the warehouse. For example, in the case of a warehouse storing items such as perishable goods, monitoring the humidity of the warehouse can prevent item spoilage.

Lighting sensors can allow for tags of the warehouse to monitor ambient lighting in the warehouse. Monitoring the ambient lighting in the warehouse can allow for tags to detect defective lights. For example, a tag can detect a light that may have failed and cause an alert to be generated to replace the failed lighting source.

Information from the number of sensors can be sent to a database (e.g., database 106, previously described in connection with FIG. 1) in response to the mobile device being within a threshold distance of one of the number tags. For example, when a user moves by a tag (e.g., within a threshold distance of a tag), the mobile device can receive the environmental conditions from the tag, and transmit the environmental conditions to the database. Mobile device 104 can transmit environmental conditions of each tag the user comes to within a threshold distance of to the database. The database can utilize the environmental conditions sensed by the number of sensors of tag 202, to monitor a warehouse in which tag 202 resides.

Tag 202 can be powered by a battery. For example, tag 202 can include a battery to power components of tag 202, such as light 208 and display 210. Using a battery to power tag 202 can allow for lower installation costs by avoiding wiring each tag of the warehouse.

Figure 3:
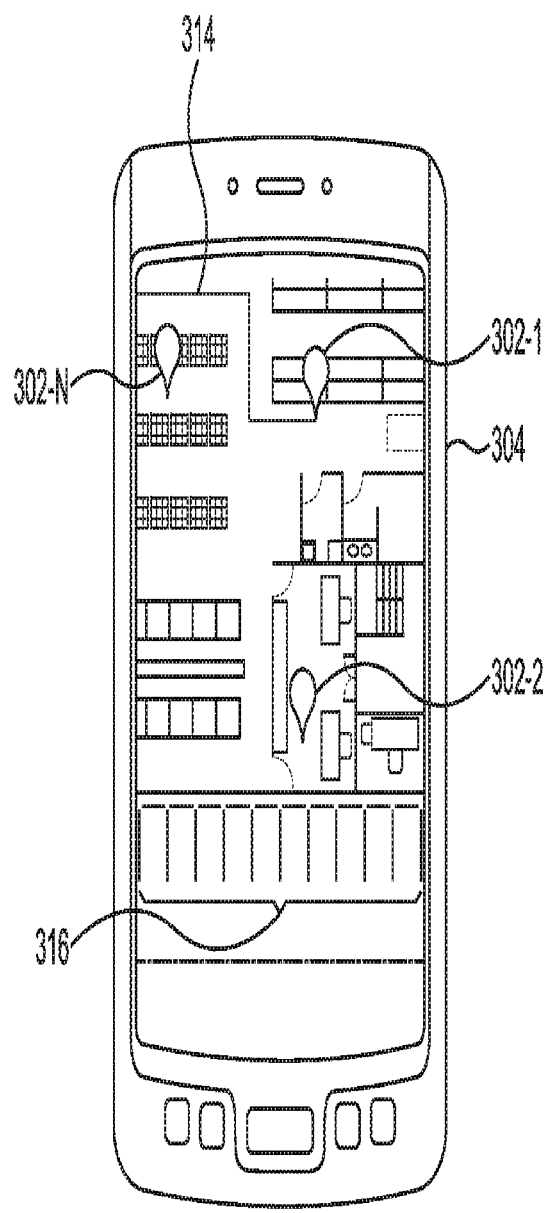
FIG. 3 illustrates a mobile device for order fulfillment, in accordance with one or more embodiments of the present disclosure.

FIG. 3 illustrates a mobile device for order fulfillment, in accordance with one or more embodiments of the present disclosure. As shown in FIG. 3, mobile device 304 can include a display of a warehouse map 316. Warehouse map 316 can display a number of tags 302-1, 302-2, 302-N, and a path 314.

Mobile device 304 can display a path to tag 302-1, 302-2, and/or 302-N on warehouse map 316 based on a tag location and a location of mobile device 304. For example, mobile device 304 can utilize location information of tag 302-1, 302-2, and/or 302-N included in order information received at mobile device 304 from a database, as well as the current location of mobile device 304 to generate path 314 from the current location of mobile device 304 to tag 302-1, 302-2, and/or 302-N.

Path 314 can be the most efficient and/or shortest path from the current location of mobile device 304 to one of the number of tags 302-1, 302-2, and/or 302-N. For example, as shown in FIG. 3, mobile device 304 can generate path 314 to tag 302-1 that is the most efficient and/or shortest path for a user of mobile device 304 to travel to tag 302-1. As used herein, the most efficient path can refer to a path that utilizes the shortest route and/or the shortest travel time from the current location of mobile device 314 to tag 302-1, 302-2, and/or 302-N. That is, path 314 can be a fastest and/or most efficient path through the warehouse to arrive at tag 302-1, 302-2, and/or 302-N.

Mobile device 304 can notify a user in response to the user deviating from path 314. For example, mobile device 314 can generate a notification for a user traveling to tag 302-1 to alert the user that the user has deviated from the most efficient path to tag 302-1. As used herein, a notification from mobile device 314 can include an audible alert and/or a vibration of mobile device 314, although embodiments of the present disclosure are not so limited to an audible and/or a vibrational notification. Alerting the user that the user has deviated from the most efficient path 314 can allow the user to move back to the most efficient path 314.

FIG. 4 is a schematic block diagram of a tag for order fulfillment, in accordance with one or more embodiments of the present disclosure. Tag 402 can be, for example, tag 102, 202, and 302-1, 302-2, and/or 302-N, previously described in connection with FIGS. 1, 2, and 3 respectively. Tag 402 can include a memory 420, a processor 418, and a display 422, configured for order fulfillment, in accordance with the present disclosure.

The memory 420 can be any type of storage medium that can be accessed by the processor 418 to perform various examples of the present disclosure. For example, the memory 420 can be a non-transitory computer readable medium having computer readable instructions (e.g., computer program instructions) stored thereon that are executable by the processor 418 to broadcast identification information unique to tag 402 and receive information from a mobile device including a pick count and instructions to activate a light of tag 402 in response to the mobile device being within a threshold distance of tag 402. Additionally, processor 418 can execute the executable instructions stored in memory 420 to activate, based on the received information, the light in response to the mobile device being within a threshold distance of the tag, and display the pick count via display 422.

The memory 420 can be volatile or nonvolatile memory. The memory 420 can also be removable (e.g., portable) memory, or non-removable (e.g., internal) memory. For example, the memory 420 can be random access memory (RAM) (e.g., dynamic random access memory (DRAM) and/or phase change random access memory (PCRAM)), read-only memory (ROM) (e.g., electrically erasable programmable read-only memory (EEPROM) and/or compact-disc read-only memory (CD-ROM)), flash memory, a laser disc, a digital versatile disc (DVD) or other optical storage, and/or a magnetic medium such as magnetic cassettes, tapes, or disks, among other types of memory.

Further, although memory 420 is illustrated as being located within tag 402, embodiments of the present disclosure are not so limited. For example, memory 420 can also be located internal to another computing resource (e.g., enabling computer readable instructions to be downloaded over the Internet or another wired or wireless connection).

As used herein, "logic" is an alternative or additional processing resource to execute the actions and/or functions, etc., described herein, which includes hardware (e.g., various forms of transistor logic, application specific integrated circuits (ASICs), etc.), as opposed to computer executable instructions (e.g., software, firmware, etc.) stored in memory and executable by a processor. It is presumed that logic similarly executes instructions for purposes of the embodiments of the present disclosure.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. An apparatus for order fulfillment, comprising:
a memory;
a processor configured to execute executable instructions stored in the memory to:
broadcast identification information unique to the apparatus, wherein the apparatus is associated with an inventory bin of a facility;
communicate with a mobile device in response to the mobile device being within a threshold distance of the apparatus;
in response to the mobile device being within the threshold distance of the apparatus, receive information from the mobile device, the information including:
a pick count of a number of items of the inventory bin; and
instructions to activate a light of the apparatus and play an audio tune by the apparatus;
based on information received from the mobile device, activate the light and play the audio tune, wherein the audio tune is unique to the mobile device;
display the pick count; and
transmit confirmation information to the mobile device in response to a button on the apparatus being pressed indicating the order information being satisfied.

2. The apparatus of claim 1, wherein the processor is configured to execute the instructions to:
sense, by a number of sensors of the apparatus, a number of environmental conditions; and
transmit the number of environmental conditions to the mobile device in response to the mobile device being within the threshold distance of the apparatus.

3. The apparatus of claim 1, wherein the processor is configured to execute the instructions to:
generate, based on the information received from the mobile device, a confirmation code; and
display the confirmation code.

4. The apparatus of claim 1, wherein the light of the apparatus is activated in a different color for each different mobile device within the threshold distance of the apparatus.

5. The apparatus of claim 1, wherein the light of the apparatus continuously blinks at a unique frequency.

6. The apparatus of claim 1, wherein the light of the apparatus continuously blinks at a unique pattern.

7. The apparatus of claim 1, wherein the light of the apparatus continuously blinks at a unique frequency and pattern.

8. The apparatus of claim 1, wherein the threshold distance corresponds to a range of a radio associated with the apparatus.

9. The apparatus of claim 1, wherein the information further comprises identity information of the mobile device, and wherein the processor is configured to execute the instructions to:
activate the light and play the audio tune based further on the identity information received from the mobile device.

10. The apparatus of claim 1, wherein the information further comprises identity information of the apparatus, and wherein the processor is configured to execute the instructions to:
activate the light and play the audio tune based further on the identity information received from the mobile device.

11. A method for order fulfillment, comprising:
broadcasting identification information unique to a tag, wherein the tag is associated with an inventory bin of a facility;
communicating with a mobile device in response to the mobile device being within a threshold distance of the tag;
in response to the mobile device being within the threshold distance of the tag, receiving information from the mobile device, the information including:
a pick count of a number of items of the inventory bin; and
instructions to activate a light of the tag and play an audio tune by the tag;
based on the information received from the mobile device, activating the light and play the audio tune, wherein the audio tune is unique to the mobile device;
displaying the pick count; and transmitting confirmation information to the mobile device in response to a button on the tag being pressed indicating the order information being satisfied.

12. The method of claim 11, further comprising:
sensing, by a number of sensors of the tag, a number of environmental conditions; and
transmitting the number of environmental conditions to the mobile device in response to the mobile device being within the threshold distance of the tag.

13. The method of claim 11, further comprising:
generating, based on the information received from the mobile device, a confirmation code; and
displaying the confirmation code.

14. The method of claim 11, further comprising:
in response to the mobile device being within the threshold distance of the tag, receiving identity information of the mobile device; and
based further on the identity information received from the mobile device, activating the light and play the audio tune.

15. The method of claim 11, further comprising:
in response to the mobile device being within the threshold distance of the tag, receiving identity information of the tag; and
based further on the identity information received from the mobile device, activating the light and play the audio tune.

16. A computer program product comprising at least one non-transitory computer-readable storage medium having computer-executable program code portions stored therein, the computer-executable program code portions comprising code instructions for:
broadcasting identification information unique to a tag, wherein the tag is associated with an inventory bin of a facility;
communicating with a mobile device in response to the mobile device being within a threshold distance of the tag;
in response to the mobile device being within the threshold distance of the tag, receiving information from the mobile device, the information including:
a pick count of a number of items of the inventory bin; and
instructions to activate a light of the tag and play an audio tune by the tag;
based on the information received from the mobile device, activating the light and play the audio tune, wherein the audio tune is unique to the mobile device;
displaying the pick count; and
transmitting confirmation information to the mobile device in response to a button on the tag being pressed indicating the order information being satisfied.

17. The computer program product of claim 16, the computer-executable program code portions further comprising code instructions for:
sensing, by a number of sensors of the tag, a number of environmental conditions; and
transmitting the number of environmental conditions to the mobile device in response to the mobile device being within the threshold distance of the tag.

18. The computer program product of claim 16, the computer-executable program code portions further comprising code instructions for:
generating, based on the information received from the mobile device, a confirmation code; and
displaying the confirmation code.

19. The computer program product of claim 16, the computer-executable program code portions further comprising code instructions for:
in response to the mobile device being within the threshold distance of the tag, receiving identity information of the mobile device; and
based further on the identity information received from the mobile device, activating the light and play the audio tune.

20. The computer program product of claim 16, the computer-executable program code portions further comprising code instructions for:
in response to the mobile device being within the threshold distance of the tag, receiving identity information of the tag; and
based further on the identity information received from the mobile device, activating the light and play the audio tune.

* * * * *